Figure 24:
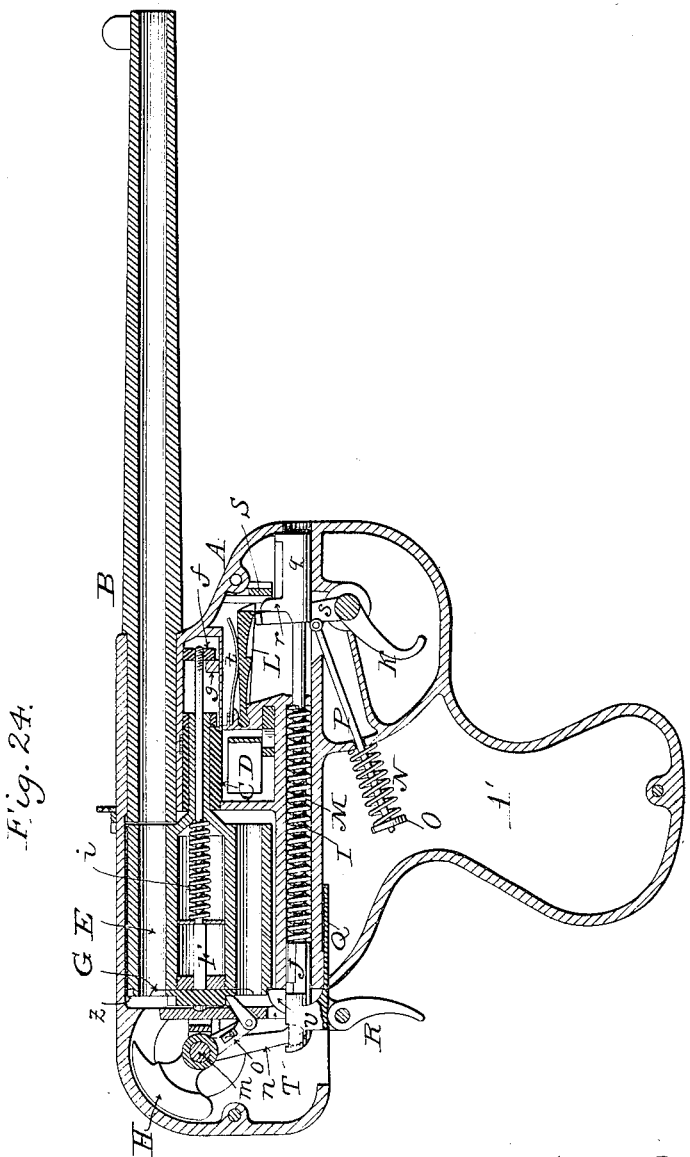

(No Model.) 5 Sheets—Sheet 1.
G. P. BLOW.
REVOLVER.
No. 514,696. Patented Feb. 13, 1894.
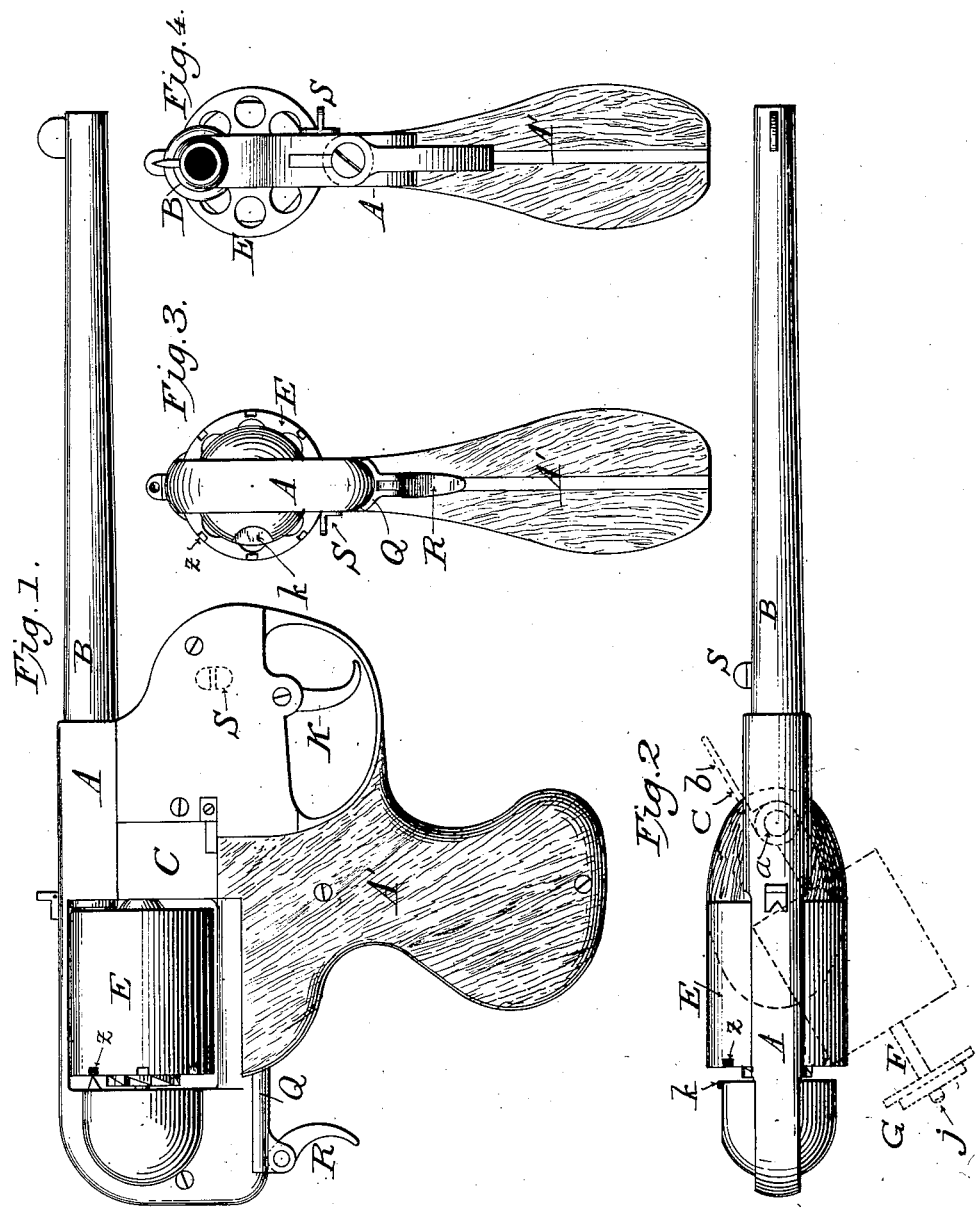
WITNESSES
Sidney P. Hollingsworth
James P. Duhamel
INVENTOR
George P. Blow
by his Attorneys,
Dodge & Sons (No Model.) G. P. BLOW. 5 Sheets—Sheet 2.
REVOLVER.
No. 514,696. Patented Feb. 13, 1894.
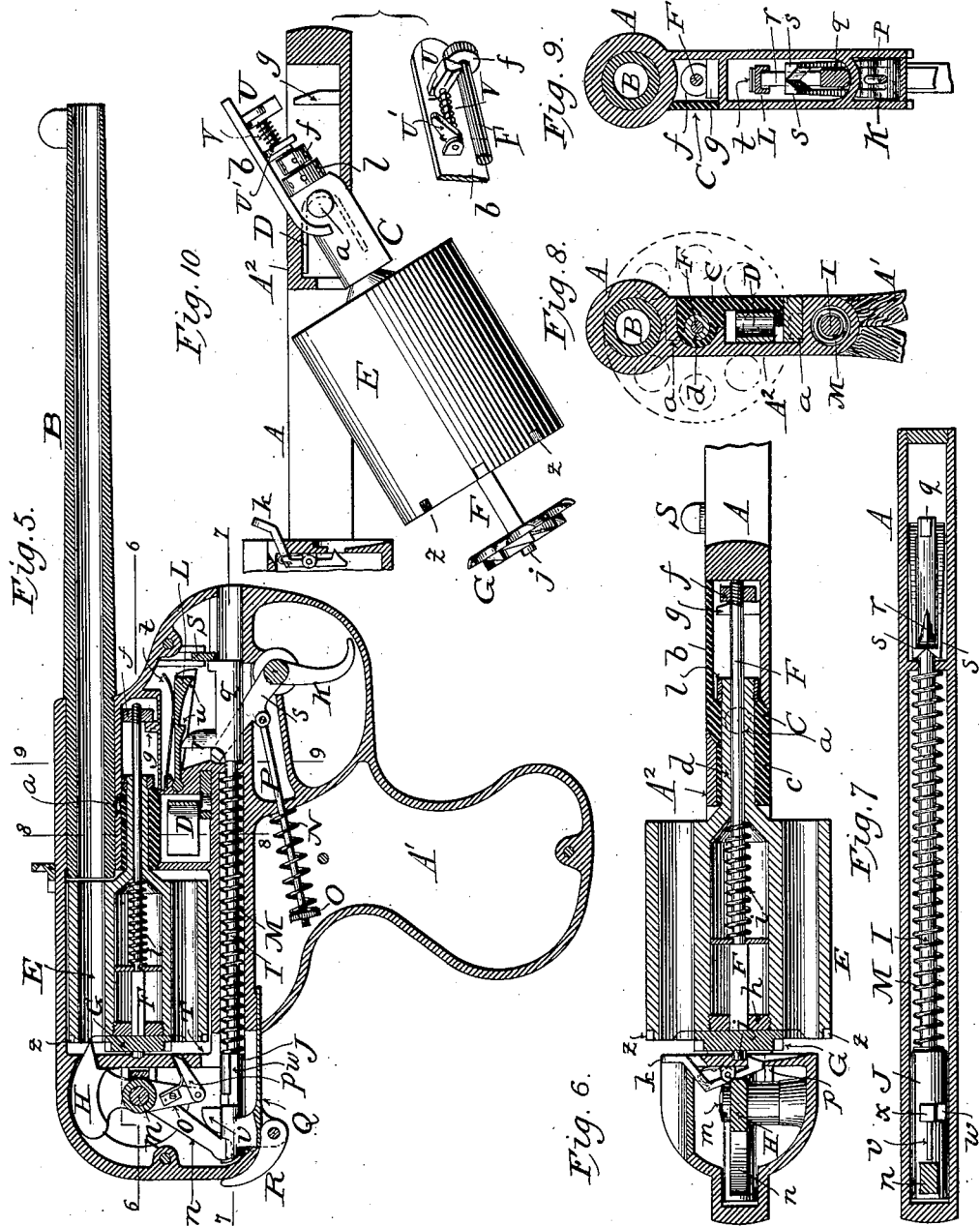
WITNESSES
Sidney P. Hollingsworth
James F. Duhamel
INVENTOR:
George P. Blow
by his Attorneys,
Dodge & Sons

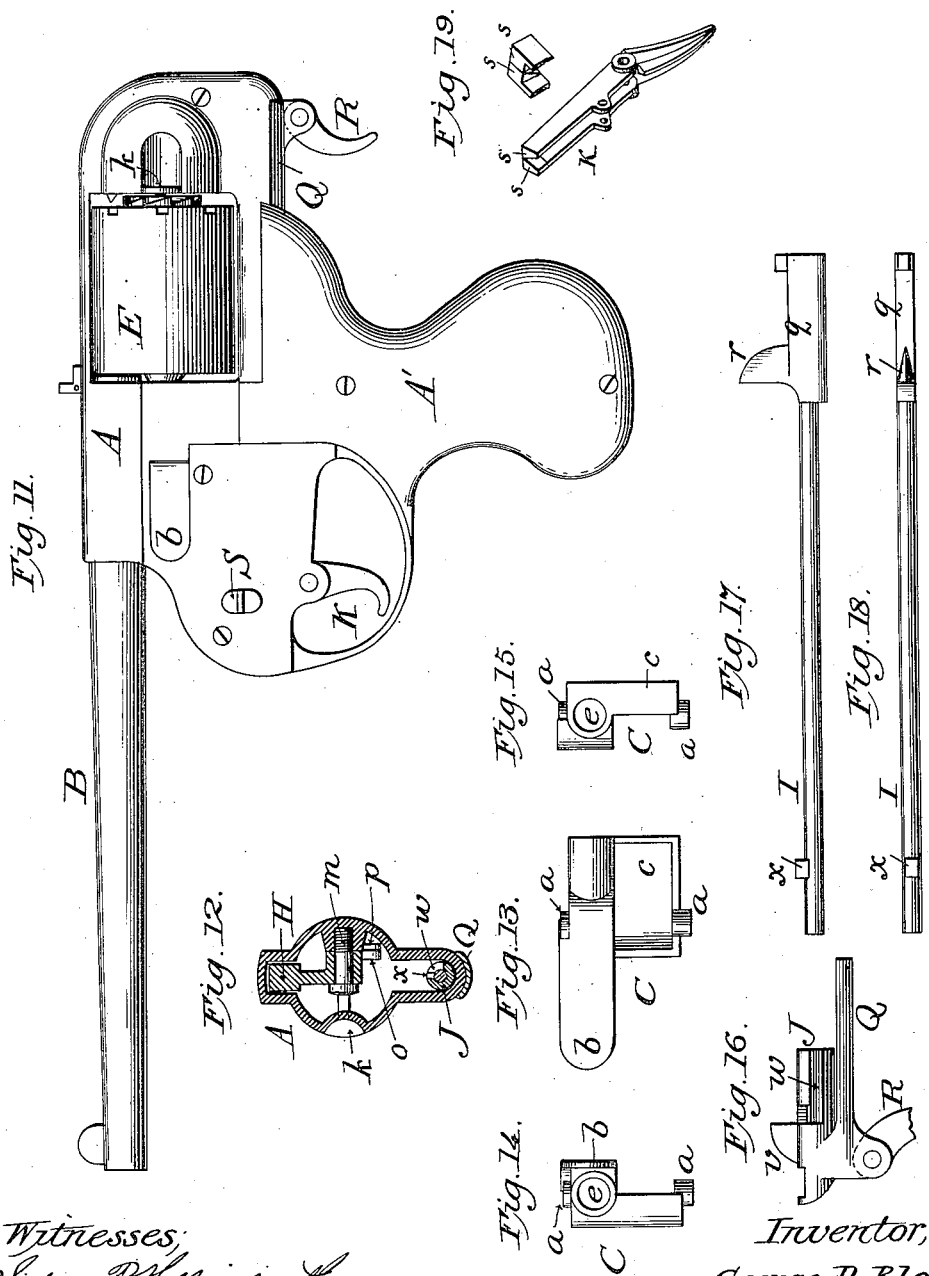

(No Model.) 5 Sheets—Sheet 4.
G. P. BLOW.
REVOLVER.
No. 514,696. Patented Feb. 13, 1894.
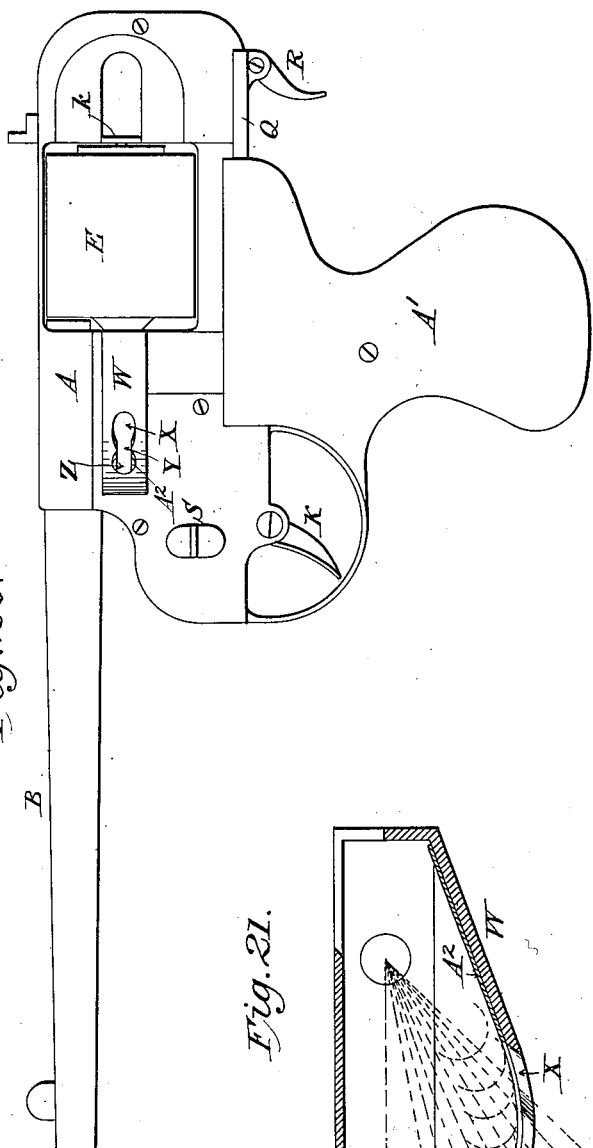
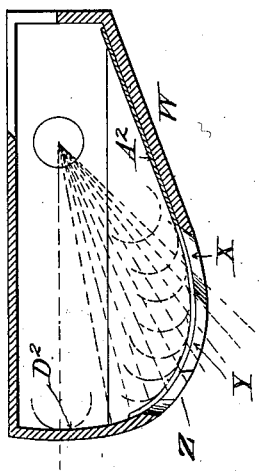
WITNESSES
Sidney P. Hollingsworth
James F. Duhamel
INVENTOR
George P. Blow
by his Attorneys,
Dodge & Sons (No Model.) 5 Sheets—Sheet 5.
G. P. BLOW.
REVOLVER.

No. 514,696. Patented Feb. 13, 1894.

Witnesses
CC Burdine
Horace A. Dodge.

George P. Blow,
Inventor:
per Dodge & Sons,
Attys.

UNITED STATES PATENT OFFICE.

GEORGE P. BLOW, OF THE UNITED STATES NAVY.

REVOLVER.

SPECIFICATION forming part of Letters Patent No. 514,696, dated February 13, 1894.

Application filed January 31, 1893. Serial No. 460,400. (No model.)

*To all whom it may concern:*

Be it known that I, GEORGE P. BLOW, ensign, United States Navy, a citizen of the United States, residing at Norfolk, in the county of Norfolk and State of Virginia, have invented certain new and useful Improvements in Revolvers, of which the following is a specification.

My invention relates to fire arms, and has reference more particularly to that class of arms designated as revolvers.

In the accompanying drawings,—Figure 1 is a side elevation of the revolver; Fig. 2, a top plan view; Fig. 3, a rear end view; Fig. 4, a front end view; Fig. 5, a vertical longitudinal sectional view; Fig. 6, a horizontal sectional view on the line 6—6 of Fig. 5; Fig. 7, a similar view on the line 7—7 of Fig. 5; Fig. 8, a vertical transverse sectional view on the line 8—8 of Fig. 5; Fig. 9, a similar view on the line 9—9 of Fig. 5; Fig. 10, a plan view of the cylinder swung around to eject the shells; Fig. 11, a view of the left side of the revolver; Fig. 12, a vertical sectional view through the hammer; Figs. 13, 14, and 15, views illustrating in detail the pivoted block in which the cylinder is journaled; Figs. 16, 17, and 18, views illustrating in detail the rod extending from the trigger to the hammer; Fig. 19, a perspective view of the trigger; Figs. 20, 21, 22, and 23, views illustrating the form of ejecting mechanism designed particularly for military uses, and Fig. 24, a vertical longitudinal sectional view showing the parts in the position they occupy just prior to firing.

A indicates the frame of the revolver, made of one piece of strong, light, drop welded steel, and B the barrel of fine oil-tempered steel screwed or shrunk into the frame.

In the Colt navy revolver the center of gravity of the piece is under the cylinder, or about three and one-half inches beyond the hand. The axis of the grip is inclined at forty-five degrees with the line of sight, which makes it necessary to hold the arm extended at full length in firing. The result of the above defects is apparent particularly in hot or wet weather, when the piece slips or droops in the hand; or when used by a near-sighted person who finds it impossible to see the sights with the arm extended. In my invention these defects are remedied by placing the grip or stock A' directly under the center of gravity of the piece, with its axis vertical or perpendicular to the line of sight. The results of this arrangement are that the turning or drooping of the piece in the hand is eliminated, and that the arm may be bent at any angle in firing to suit the convenience of the user. This form of frame and location of the grip also allows the barrel to be lengthened about fifty per cent., thereby increasing the accuracy and range without increasing the total length of the piece.

In the old pattern of revolver as furnished to the navy, the recoil was taken up on the lower part of the rear of the palm of the hand, and about four inches below the axis of the piece. This caused the piece to rise or jump when fired, and high shooting was the result. Under my invention, however, the grip is so shaped and located that the recoil is taken up on the upper part of the hand between the thumb and forefinger, or about one and one-half inches below the barrel, thereby reducing the jump to a minimum. The great length of barrel insures the burning of all the powder, thus enabling me to decrease the charge.

As shown in Figs. 5, 6, 8, 9, and 10, the frame A is cut away from side to side to receive a block C of the form shown in said figures and also in Figs. 13, 14 and 15. This block is provided with vertical pivots or journals $a$ which permit it to swing laterally as shown in Fig. 10, the forward arm or portion $b$ of the block swinging out through the left side of the frame, and the rear portion $c$ swinging out through the right side of the frame.

That portion of the frame A opposite the rear part of the block, is closed, to form a wall or abutment $A^2$,—Figs. 6, 8, and 10,—against which bears one arm or leaf of a spring D,—the other arm or leaf of said spring bearing against the rear portion $c$ of the block C which is formed to receive and seat it, as shown in Fig. 8.

The cylinder E is provided at its front end with a tubular shank or stem $d$ which is mounted in the hole or opening $e$ in the upper end of the block C, as shown in Figs. 5, 6, 8, 9, and 10; and through this shank or stem projects the ejector rod F, carrying at its rear end the usual ejecting plate or disk G which fits into the recessed end of the cylinder. At its forward end the rod F is provided with a head or enlargement $f$,—preferably a nut,— which is designed to engage a projection $g$ on the main frame as shown in Figs. 5, 6, 9, and 10. The rear end of the central bore or cavity of the cylinder is closed by a disk or washer $h$,—Figs. 5, 6, and 23,—and through this disk the rod F passes freely. The rod F is encircled, between the front closed end of the cylinder and a shoulder or washer on the rod, by means of a coiled spring $i$, the tendency of which (under the construction illustrated in Figs. 5, 6, and 10) is to draw the rod and ejector plate backward. So long, however, as the cylinder remains in line with the barrel, this cannot be done, as the said plate, or a lug or projection $j$ formed thereon, is in engagement with the frame, as shown in Figs. 1, 5, 6, and 11. When the cylinder, and the block in which it is journaled are swung around horizontally as indicated in Fig. 10 and by dotted lines in Fig. 2, the head or enlargement $f$ is disengaged from the lug $g$, and the coiled spring $i$ immediately throws the ejector plate outward and discharges the shells automatically.

When the cylinder is thrown around to the position in Figs. 2 and 10, it becomes necessary, in order to reload, to push the ejector back into place and hold it in such position. To secure this result, I provide the arm $b$ of block or carrier C, with a vertically moving, pivoted spring catch U, Fig. 10, which, when the ejector is shoved into place in the cylinder, engages the inner face of the nut $f$ on rod or stem F. The spring V of the catch U (Fig. 10) prevents the spring catch from rising up out of engagement with the nut while the cylinder is being filled. When filled, the cylinder is swung around to the firing position shown in Fig. 6, and the arm U' of the spring catch, being brought into engagement with the wall of the frame A, causes a very slight rocking movement of the catch, and thus releases the head or enlargement of the ejector rod, and allows the same to engage the lug $g$. When the cylinder is again swung around laterally as shown in Fig. 10, the spring $i$ may operate the ejector.

While means have thus been provided for locking the ejector at its forward end, it is necessary to provide means at the rear end of the cylinder to prevent the cylinder from being swung or thrown out laterally by spring D. The means I employ comprise an elbow lever $k$ pivoted in the frame in rear of the cylinder, as shown in Figs. 6 and 10, to engage the lug or projection $j$ on the ejector. The free end of the lever projects out through the side of the frame on the left hand side, (see Figs. 3, 6, 10, 11, and 23) so that by pressing the lever forward by hand, as shown in Fig. 10, it will be disengaged from the ejector. As soon as thus disengaged, the spring D throws the cylinder around laterally. The forward end of the cylinder stem $d$ is threaded to receive a nut $l$ by means of which the said cylinder is held in place in its block or carrier.

H, Figs. 5, 6, and 12, indicates the hammer which is pivoted upon screw $m$, and which is provided with two downwardly-extending arms, $n$ and $o$. To one of these arms, $o$, is pivoted a spring-pressed pawl $p$ which, working through an opening in the frame, is designed to engage the ejector (which interlocks with the cylinder) and turn the cylinder when the hammer is cocked. The second arm $n$ of the hammer is longer than the arm $o$ and extends downward into engagement with the rear end of the rod or stem I mounted within the casing below the cylinder, as shown in Fig. 5. The hammer arm $n$ does not engage directly with the rod or stem I, but with a sleeve J, Figs. 5, 7, and 16, having, for convenience in assembling the parts, a bayonet-joint connection with the rod. The forward end of rod or stem I has a head or enlargement $q$ (flattened on the sides and extended vertically and lengthwise) and a lug or projection $r$ on the upper face of the head, as shown in Figs. 5, 7, 17, and 18. This lug $r$ has its front edge curved on the arc of a circle, and has its side faces made tapering toward such edge, to readily enter between the upwardly-extending arms $s\,s$ of the trigger K. These arms $s\,s$ pass upward on opposite sides of the head $q$ of rod I, and have their upper ends turned inward toward each other, as clearly shown in Figs. 7, 9, and 19. On their rear faces, the upper ends of the arms are beveled toward the center as also shown in said figures, so as to facilitate the entrance between them of the lug $r$.

Immediately above the lug $r$ is a plate L, pivoted at its rear end in the main frame, and held normally down in contact with the lug $r$ by means of a spring $t$; said plate being provided on its under face with two (or more) shoulders or teeth $u\,u$ of different lengths with which the lug $r$ is designed to come successively into engagement. Rod or stem I is encircled by a coiled spring M which bears at one end against the sleeve J, and at its forward end against a portion of the frame; said spring tending to move the rod backward or rearward relatively to the frame in which it is mounted. In Figs. 5 and 7 the spring is shown extended to its full limit, the rod moved rearward, and the hammer thrown forward to firing position. With these parts in this position, I will describe the operation of cocking the weapon. The user pulls the trigger, rocking the same upon its pivot and throwing the inturned ends of the arms $s\,s$ against the rear flat face of lug $r$. Continuing this movement, the lug, and the rod or stem I to which it is attached, move forward and place the spring M under compression, at the same time rocking the hammer K upon its pivot. As the lug $r$ moves past or from beneath the first shoulder $u$ of plate L, the spring $t$ throws the said plate down into such position that its shoulder will prevent a return of the lug $r$ and its rod I, and therefore will hold the parts in the half-cock position even though the finger be removed from the trigger. If the trigger be moved still farther, the parts will be brought into full-cock position,—that is, the lug $r$ will pass from beneath the second or deeper tooth shoulder $u$ of plate L and the parts will be held in this position by reason of the engagement of said plate with the lug. The piece is now on the point of firing, (see Fig. 24) which result is secured by further pulling upon the trigger and throwing its arms $s\ s$ upward and forward until by striking against the under side of plate L they will lift said plate upward out of engagement with the lug $r$. There being nothing to hold the rod I, its spring M moves the rod backward suddenly and throws the upper end of the hammer forward with considerable force. After firing, the arms $s\ s$ of the trigger will be found in front of the lug $r$, and to insure the entrance of the lug between them, when the arms of the trigger swing backward, they are beveled on their rear upper faces, while the lug is beveled on its front edge as before explained. In order to force these arms back over the lug $r$, I employ a coiled spring N which bears at one end against the frame of the grip or stock (Fig. 5) and at the opposite end against a nut O, which latter is secured to the end of a rod P connected to the trigger above its axis. By means of the nut O the tension of the spring may be easily and accurately regulated.

Sleeve J to which I have already referred,—and which is shown in Figs. 5, 7, and 16,—is provided with a lug $v$ to engage slots or notches $z$ in the periphery of the cylinder, and provided also with an angular slot $w$ to receive a lug or projection $x$ on the rear end of rod I.

It will be noticed that the main frame, in rear of the cylinder, is cut away or provided with an opening T, to allow the lug $v$ to enter therein and engage the notches in the cylinder. From this construction it will be seen that unless the cylinder be in proper position the hammer cannot be cocked, as the lug $v$ on the rod which effects the cocking, will strike against the rear end of the cylinder and prevent the rod moving forward the requisite distance. The lug $v$ engaging the cylinder holds the latter stationary until the weapon is fired.

The cylinder may be turned by hand either way until the hammer is raised to half-cock; can be turned only from right to left between half and full cock; and cannot be turned at all when at full cock. By turning this sleeve axially to the left, the longitudinal portion of the slot $w$ will be brought into line with the lug $x$, and hence the rod I may be readily disengaged from the sleeve. The sleeve is provided with a plate Q which fits the frame, and covers an opening in the under side thereof; and is also provided with a hinged or pivoted finger piece R which is designed to fold up against the rear end of the frame as in Fig. 5, or to hang down in the position shown in Figs. 1, 11, and 16.

In order to prevent the rod I from being moved forward, I employ a vertically moving safety latch S,—Figs. 1, 2, 3, 4, 5, and 11,—which is designed to move down in front of the forward end of the rod I,—said latch projecting out through the side of the frame so as to be operated by hand.

In the construction shown in Figs. 20 to 23 inclusive, the ejector is moved rearwardly to throw out the empty shells, by means of a cam W instead of a spring as in the previously-described construction.

The cylinder swings laterally and the head or enlargement $f'$ on the ejector rod acts, in swinging, against a cam W which is formed on the left hand side of the piece as shown in Figs. 21 and 23. This cam is so formed that when the cylinder is swung to the position shown in Fig. 23, the shells will have been ejected, and the ejector-rod brought into line with a hole X in the side wall of the frame or the cam. The spring $i'$ which was compressed within the cylinder during the rearward movement of the ejector, now shoots or forces the ejector rod through said hole X as indicated by the dotted lines in Fig. 23, thus leaving the piece ready for reloading. It will be noticed that the cam W is further provided with a straight slot Y of a width equal to the diameter of the rod F behind its head, which slot communicates at its rear end with the hole X, and at its forward end with a second hole Z, (Figs. 20, 21, and 23).

$A^2$ indicates a latch which is secured to the inside of the frame over the slot and the holes in the cam surface,—said latch being preferably made in the form of a spring. It will be noticed upon reference to Fig. 22 that this latch is provided with a hole or opening $B^2$ which conforms in size and position to the hole X; and is further provided with a slot $C^2$ which extends from the hole $B^2$ to the end. The slotted end of the latch lies over or overlaps the hole Z in the cam or frame, and prevents the head of the ejector rod from passing out through said hole, but is free to yield inward to allow the said head to pass inward through the hole. When the cylinder is first swung around, there is no sliding movement given to the ejector because the end wall $D^2$ of the cam is inactive or is made concentric with the cylinder pivot. This is essential, as it is necessary to swing the rear end of the cylinder clear of the frame before permitting any rearward movement of the ejector. As soon as the rear end of the cylinder clears the frame, the head or enlargement $f'$ rides over the slotted end of the latch (which prevents the head from engaging the hole or opening Z), and the ejector is gradually moved rearwardly, expelling the shell and compressing the spring $i'$ as the cylinder continues to swing laterally. When the parts are brought to the position shown in Fig. 23, the spring shoots the rod through the holes B² and X. Now when the cylinder is being brought to closed position, the stem of the rod rides along the slots Y and C² in the cam and the latch, and just before the cylinder reaches the firing position the head $f'$ enters the hole Z and comes against the latch. As the latter is yielding, its free slotted end is raised or pushed inward far enough to allow the head to slip in behind it and to resume its proper position. After the ejector has resumed its normal position, the latch also returns to its proper position over the hole Z.

The ejector rod F is made angular in cross section at its rear end where it passes through disk $h$ so as to insure the turning or rotation of the cylinder when the plate or disk G is engaged by the pawl $p$.

The cylinder is bored tapering or conical,—that is,—the rear ends of the chambers are made slightly larger than their front ends, the difference in diameter of opposite ends of the chambers being so slight as not to be perceptible in the drawings. These chambers are so made for the purpose of facilitating the ejection of the empty shells,—great difficulty and annoyance being occasioned in the navy revolver by the shells sticking in the cylinder, but as this feature is not specifically claimed,—being old,—it is not illustrated.

The operation under different conditions or requirements is as follows: Suppose the revolver to be loaded and ready for service; in this case the safety lock S on the left side of the piece is raised so as to release the rod or stem I.

*Single action.*—Holding the piece firmly in the right hand by the stock or grip, place the right thumb over the cock or finger piece R and press it toward the muzzle. As the rod or stem I moves forward the hammer H is raised and the lug or cam $r$ at the forward end of the rod begins to lift the pawl of plate L upward against its springs $t$ until the lug or cam passes the first tooth or shoulder $u$, when the said tooth drops down behind the lug. At the same moment the cylinder pawl $p$ engages the ratchet head C of the ejector and begins to rotate the cylinder into firing position. The piece may now be considered as at half-cock,—a position of perfect safety, since no jar or shock can force the lug $r$ backward against the action of the pawl or plate L. As the cock or finger piece R is forced farther forward, the pawl or plate L is again raised until the lug or projection $r$ passes the second tooth, when the said pawl or plate again drops downward and holds the rod or stem against backward movement. During these operations, the pawl $p$ has turned or rotated the cylinder and the lug $v$ on the rear end of the rod I has entered one of the notches $z$ in the cylinder. It will be observed that the piece cannot be cocked until this lug $v$ has entered one of the notches $z$ at the base of the cylinder, thereby insuring perfect safety of the piece. This position corresponds to full cock, and it will be seen that it is impossible to fire the piece from any position unless the trigger is pulled.

*Firing.*—When the trigger is pulled, the arms $s\,s$ move upward and forward, the inwardly-projecting ends of the heads passing under the first tooth of pawl L without engaging it, but strike the incline of the second tooth and raise the pawl until the latter clears the lug $r$ and allows the spring M to throw the rod I rearward suddenly and actuate the hammer to explode the cartridge. The lug or projection $r$ passes rearwardly between the two arms of the trigger and beneath the heads or inwardly-turned ends of said arms. When the trigger is released, the coiled spring N tends to pull the two arms $s\,s$ back into their original position. As previously explained, the lug is wedge-shaped on its front edge, and when the trigger arms reach the lug, the latter forces them apart,—an operation that is facilitated or insured by having the rear faces of the arms $s$ beveled or inclined. At the same time the trigger spring is tending to pull the arms to the rear, past the lug, and as soon as they pass the lug, the arms spring together again, when the revolver is ready for firing once more.

*As a self-cocker.*—To fire the revolver as a self-cocker, it is only necessary to pull the trigger. As the arms $s\,s$ move upwardly and forwardly, they press against the thick rear edge of the lug $r$ and force it and the whole firing gear forwardly, at the same time raising the pawl L and preventing it from dropping behind the lug. During this operation the piece is cocked, the cylinder turned and clamped in firing position, and the piece made ready to fire, as has been previously explained. When the arms $s\,s$ have reached a vertical position the lug slips through or between the trigger arms and flies to the rear,—causing the hammer to explode the cartridge,—the pawl L being held up out of engagement with the lug $r$, by the heads of the trigger arms.

*Reloading.*—The piece (Figs. 1 to 9 inclusive) being empty and the cylinder open, it becomes necessary to reload. With the right thumb push the ejector head back into place until the nut $l$ on the end of the rod or stem catches in the spring catch U. Draw a package of cartridges from the pouch (the cartridges being put up in paper packages ready for use), and force the cartridges into the cylinder with the right thumb. Close the piece by forcing the cylinder to the left until the end $j$ of the ejector head passes by and engages the latch $k$. If the piece is not to be used at once, push down the safety bolt S and lock the firing gear for safety. In reloading the piece shown in Figs. 20 to 23, it is only necessary to release catch $k$ and swing the cylinder laterally and allow the cam to force the shells out. When the shells have been ejected, the spring $i'$ returns the ejector to place and the cylinder is ready for refilling. When refilled, swing it back into firing position.

*Ejecting apparatus.*—The opening of the cylinder and ejection of the empty shells are done automatically and simultaneously. By releasing the latch $k$ on the left side of the piece, the carrier block C with the cylinder is swung laterally to the right by the strong spring D. As soon as the forward part of the carrier block is clear of the left side of the frame of the revolver, the nut $f$ on the end of the ejector shaft (in the piece shown in Figs. 1 to 19 inclusive) is released from the lug $g$ on the frame, and the ejector spring $i$ forces the ejector to the rear and throws out the empty shells. In case the ejector spring $i$ should be broken, the empty shells can be ejected by hand by pushing the ejector shaft or stem rearwardly.

The operation of the ejecting mechanism shown in Figs. 20 to 23 has already been fully described.

While there is a limit of length of barrel for the revolver, this limit does not apply to a cavalry carbine. It is proposed, therefore, to still further increase the length of the barrel, and add a light shoulder piece which can be detached when not in use, as is now commonly done.

Having thus described my invention, what I claim is—

1. The combination of the hammer, the rod connected therewith, the rod-spring, and the trigger having a yielding connection with the rod.

2. The combination with the rod and its spring, of the hammer and the trigger connected with the rod, and a pawl L to engage the rod.

3. In combination with the rod I having the spring M and the lug $r$; the pawl or plate L to engage the lug; the trigger K provided with an upwardly-extending arm $s$ to engage the lug and the pawl; and a hammer connected with the rod.

4. In combination with the rod I having the lug $r$ and spring M; the pawl L provided with teeth $u\ u$; the trigger K provided with arms $s\ s$ to straddle the lug; and a hammer connected with the rod.

5. In combination with rod I having a spring M, and a lug $r$ sharpened on its front edge; pawl L to engage the lug; trigger K provided with two separated arms $s\ s$, beveled on their upper rear faces; and a hammer connected with the rod.

6. In combination with the hammer having the arms $n$ and $o$; a pawl $p$ carried by the arm $o$; a cylinder to be engaged by the pawl; a rod I connected with the hammer; and means for reciprocating the rod.

7. In combination with the hammer; the rod I connected therewith and provided with lug $r$; latch or pawl L to engage the lug; a trigger having arms $s\ s$ to engage the lug and latch; a rod P connected with the trigger, and a spring N bearing at one end against a nut on the rod, and at the other end against a part of the frame.

8. In combination with a hammer and a trigger; an interposed rod and spring; and a finger piece R secured to the rod to actuate the same independently of the trigger.

9. In combination with a hammer; a rod connected therewith; a finger piece for moving the rod forward; a latch to engage the rod; a trigger for releasing the rod; and a spring to move the rod rearwardly.

10. In combination with a hammer; a rod connected therewith and provided with a lug $r$; the spring M; and the trigger K provided with two yielding arms to engage the lug and move the rod in one direction, then allow the lug to pass freely between them, and finally, to separate and pass on opposite sides of the lug.

11. In combination with the frame and the barrel secured thereto; a block C mounted in the frame on vertical pivots and adapted to swing horizontally; and a cylinder provided with an ejector and journaled in the block.

12. In combination with the main frame and barrel; the block C mounted therein on vertical pivots; the cylinder journaled in the block; the spring D serving to swing the cylinder and block laterally with reference to the main frame and barrel an ejector carried by the cylinder; and a catch $k$ to engage the ejector and lock the cylinder against such lateral movement.

13. In combination with the main frame; the block C pivoted therein to swing laterally with reference to the frame and barrel; the cylinder journaled in the block; the ejector plate provided with a rod F to pass centrally through the cylinder; and a spring within the cylinder to act upon the rod F when the cylinder is swung around.

14. In combination with the main frame having the fixed cam W; the rotatable cylinder mounted in the frame to swing laterally; and an ejector provided with a rod or stem to bear upon the cam as the cylinder swings with reference to the barrel and frame.

15. In combination with the main frame; the cam W provided with slot Y and holes X and Z; the cylinder pivoted in the frame and adapted to swing laterally with reference thereto; and an ejector rod adapted to bear upon the cam.

16. In combination with the main frame; the cam W provided with slot Y and holes X and Z; the cylinder pivoted in the frame and adapted to swing laterally with reference thereto; and an ejector rod adapted to bear upon the cam; and a spring to return the ejector to its normal position.

17. In combination with the main frame; the cam W provided with slots Y and holes X and Z; the laterally-swinging cylinder pivoted in the frame; a latch on the inner face of the cam; and an ejector rod to bear upon the cam.

18. In combination with the main frame, the cam W provided with holes X and Z and connecting slot Y; the laterally swinging cylinder; the latch secured to the inner face of the cam and provided with slot $C^2$ and holes $B^2$; and the ejector rod adapted to be actuated by the cam.

In witness whereof I hereunto set my hand in the presence of two witnesses.

GEORGE P. BLOW.

Witnesses:
WALTER S. DODGE,
HORACE A. DODGE.